United States Patent
Yoda et al.

(10) Patent No.: US 7,542,720 B2
(45) Date of Patent: Jun. 2, 2009

(54) COMMUNICATION APPARATUS

(75) Inventors: Akira Yoda, Kanagawa (JP); Kiyotaka Kaneko, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 574 days.

(21) Appl. No.: 10/768,026

(22) Filed: Feb. 2, 2004

(65) Prior Publication Data

US 2004/0152440 A1 Aug. 5, 2004

(30) Foreign Application Priority Data

| Feb. 3, 2003 | (JP) | ............................. 2003-026256 |
| Jan. 8, 2004 | (JP) | ............................. 2004-003298 |

(51) Int. Cl.
*H04B 5/00* (2006.01)

(52) U.S. Cl. .................... 455/41.1; 358/1.15

(58) Field of Classification Search ............... 455/41.2, 455/414.1, 425, 556.2, 557, 566, 151.2, 452.2, 455/521.1, 41.1, 411, 518, 519, 515; 348/211.2, 348/14.04, 207.1, 211.1; 340/870.38; 358/453, 358/302, 1.15

See application file for complete search history.

(56) References Cited

U.S. PATENT DOCUMENTS

| 6,532,368 | B1 * | 3/2003 | Hild et al. .................... 455/515 |
| 6,714,797 | B1 * | 3/2004 | Rautila ...................... 455/552.1 |
| 6,801,777 | B2 * | 10/2004 | Rusch ....................... 455/452.2 |
| 7,082,316 | B2 * | 7/2006 | Eiden et al. ................. 455/519 |
| 2002/0154221 | A1 * | 10/2002 | Ishimaru .................. 348/207.1 |
| 2003/0151631 | A9 * | 8/2003 | Miyata et al. ............... 345/838 |
| 2003/0184815 | A1 * | 10/2003 | Shiki et al. ................. 358/453 |
| 2005/0105724 | A1 * | 5/2005 | Hull et al. .................... 380/200 |

FOREIGN PATENT DOCUMENTS

| JP | 2002-132477 | 5/2002 |
| JP | 2002-236651 | 8/2002 |
| JP | 2002-261702 | 9/2002 |
| JP | 2002-297345 | 10/2002 |

* cited by examiner

*Primary Examiner*—Tu X Nguyen
(74) *Attorney, Agent, or Firm*—Birch, Stewart, Kolasch & Birch, LLP

(57) ABSTRACT

A communication apparatus which specifies the destination of the data accurately and transmits the data without complicated operation such as designating the destination. The communication apparatus includes: a body communication section for communicating with a communication apparatus other than the communication apparatus through a human body; an instrument identification information acquiring section for acquiring instrument identification information on the other communication apparatus from the other communication apparatus using the body communication section when the human body touches the body communication section of the communication apparatus and a body communication section of the other communication apparatus; a data communication section for communicating with the other communication apparatus through communication means other than the human body; and a data transmitting section for transmitting data to the other communication apparatus identified by the instrument identification information acquired by the instrument identification information acquiring section using the data communication section.

11 Claims, 11 Drawing Sheets

COMMUNICATION APPARATUS

This patent application claims priority from Japanese patent applications No. 2003-026256 filed on Feb. 3, 2003 and No. 2004-003298 filed on Jan. 8, 2004, the contents of which are incorporated herein by reference.

BACKGROUND OF THE INVENTION

1. Field of the Invention

The present invention relates to a communication apparatus. More particularly, the present invention relates to a communication apparatus which communicates with another device through a user's body.

2. Description of the Related Art

In recent years, with large increase in the data transfer rate of a portable telephone, the portable telephone is used for not only as a telephone, but also widely used as a terminal for data communication. For example, it has been developed a portable telephone equipped with a camera which can transmit an image photographed with the camera to a communication apparatus such as a personal computer.

Moreover in recent years, it has been developed personal area network technology that uses the human body to transmit electronic data between a small chip embedded in a device carried by a user and another device touched by a user's finger. Moreover, it is envisioned that the personal area network will be applied to an entry control system, an automatically lockable door, and a computer login system.

However, when transmitting the image photographed with the camera in the conventional portable telephone to the personal computer, the portable telephone has to be connected to the personal computer by cable, and a user of the portable telephone has to learn complicated procedure to transmit the image, such as how to attach the photographed image on e-mail and send it. Therefore, it is not very easy for the user of the conventional portable telephone to transmit the photographed image to the personal computer.

SUMMARY OF THE INVENTION

Therefore, it is an object of the present invention to provide a communication apparatus which can solve the foregoing problems. The above and other objects can be achieved described in the independent claim. The dependent claims define further advantageous and exemplary combinations of the present invention.

According to an aspect of the present invention, there is provided a communication apparatus for communicating with another device through a body of a user. The communication apparatus for communicating with another device through a body of a user, including: a body communication section for communicating with a communication apparatus other than the communication apparatus through the human body; an instrument identification information acquiring section for acquiring instrument identification information on the other communication apparatus from the other communication apparatus using the body communication section when the human body touches the body communication section of the communication apparatus and a body communication section of the other communication apparatus; a data communication section for communicating with the other communication apparatus through communication means other than the human body; and a data transmitting section for transmitting data to the other communication apparatus identified by the instrument identification information acquired by the instrument identification information acquiring section using the data communication section.

The communication apparatus may further include a displaying section for displaying an image, and the data transmitting section may transmit the image being displayed on the displaying section to the other communication apparatus when the instrument identification information acquiring section acquires the instrument identification information while the displaying section displaying the image.

The communication apparatus may further include an instrument identification information supply section for supplying the other communication apparatus with the instrument identification information on the communication apparatus using the body communication section to establish communication with the other communication apparatus.

An error rate of communication through the data communication section may be less than an error rate of communication through the body communication section. Moreover, a transfer rate of communication through the data communication section may be greater than a transfer rate of communication through the body communication section.

The other communication apparatus may be a printing apparatus including a body communication section for communicating through the human body. The instrument identification information acquiring section may acquire instrument identification information on the printing apparatus from the printing apparatus using the body communication section when the body touches the body communication section of the communication apparatus and the body communication section of the printing apparatus, and the data transmitting section may transmit the image data to the printing apparatus identified by the instrument identification information acquired by the instrument identification information acquiring section using the data communication section so that the image data stored on the communication apparatus is to be printed.

The instrument identification information acquiring section may acquire instrument identification information on the printing apparatus multiple times from the printing apparatus using the body communication section when the body touches the body communication section of the communication apparatus and the body communication section of the printing apparatus multiple times during a predetermined time interval, and the data transmitting section may transmit the number of sheet for printing corresponding to the number how many times the instrument identification information acquiring section acquires the instrument identification information as incidental information on the image data with the image data to the printing apparatus identified by the instrument identification information acquired by the instrument identification information acquiring section using the data communication section so that a plurality of files of image data stored on the communication apparatus are to be printed.

The other communication apparatus may be a record medium including a body communication section for communicating through the human body. The instrument identification information acquiring section may acquire instrument identification information on the record medium from the record medium using the body communication section when the body touches the body communication section of the communication apparatus and the body communication section of the record medium, and the data transmitting section may transmit image data to the recording device using the data communication section so as to store data stored on the communication apparatus on the record medium when the communication apparatus and the recording device, in which the record medium were inserted, are connected through the data communication section.

The summary of the invention does not necessarily describe all necessary features of the present invention. The present invention may also be a sub-combination of the features described above.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
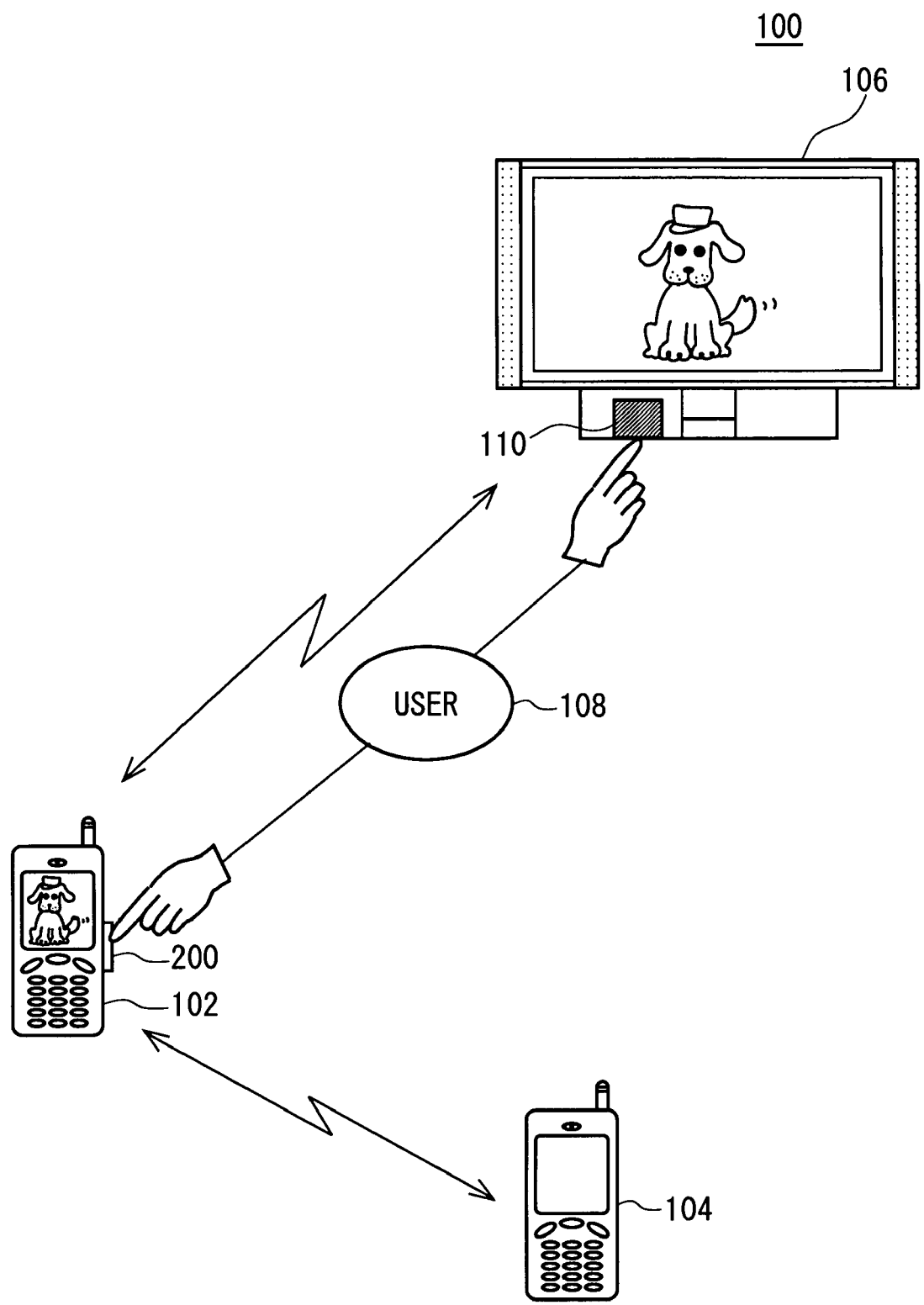
FIG. 1 is a schematic diagram exemplary showing a configuration of a communication system according to a first embodiment.

FIG. 1 is a schematic diagram exemplary showing a configuration of a communication system 100 according to a first embodiment of the present invention. The communication system 100 includes portable terminals 102 and 104, which are capable of communicating with another device by radio and/or through a human body, and a displaying apparatus 106 for displaying an image. Each of the portable terminals 102 and 104 and the displaying apparatus 106 is an example of a communication apparatus of the present invention. For example, the portable terminal 102 is a portable telephone, a PDA, a notebook sized personal computer, etc., and the displaying apparatus 106 is a television, an electronic photo frame, etc.

The portable terminal 102 and the displaying apparatus 106 transmit and receive instrument identification information to/from each other through a body of the user 108 between a body communication section 200 included in the portable terminal 102 and a body communication section 110 included in the displaying apparatus 106. Then, the communication is established through the communication means other than the body of the user 108 using the instrument identification information acquired through the body of the user 108, and data is transmitted and received to/from one another. For example, communication is established through infrared radiation, Bluetooth, wireless LAN, wired LAN or the Internet, and then data is transmitted and received to/from each other.

For example, the portable terminal 102 is held by one hand of the user 108 and the other hand of the user 108 touches the displaying apparatus 106. Then, the displaying apparatus 106 transmits the instrument identification information on the displaying apparatus 106 to the portable terminal 102 through the body of the user 108. Then, the portable terminal 102 transmits the data designated by the user 108 to the displaying apparatus 106, which is identified by the received instrument identification information, through the communication means other than the body of the user 108. For example, the image currently displayed on the portable terminal 102 is transmitted to the displaying apparatus 106 as the image designated by the user 108. Alternatively, on receiving the image from the portable terminal 102, the displaying apparatus 106 notifies the user 108 that the data transfer has been completed by displaying the received image.

When the image acquired by a potable telephone, which is an example of the portable terminal 102, is to be displayed on a large display, the image is easily transmittable to a television, which is an example of the displaying apparatus 106, so that the television displays the image. Moreover, when an image is acquired from a person on the other end of the line during a telephone call with the portable telephone, since the acquired image can be easily transferred to the television, the image can be displayed on the large television display during the telephone call. Moreover, since the communication apparatus, which is to receive the data, is selected by the user 108 by touching the designated communication apparatus, the designated communication apparatus is correctly selected among a plurality of communication apparatuses.

Figure 2:
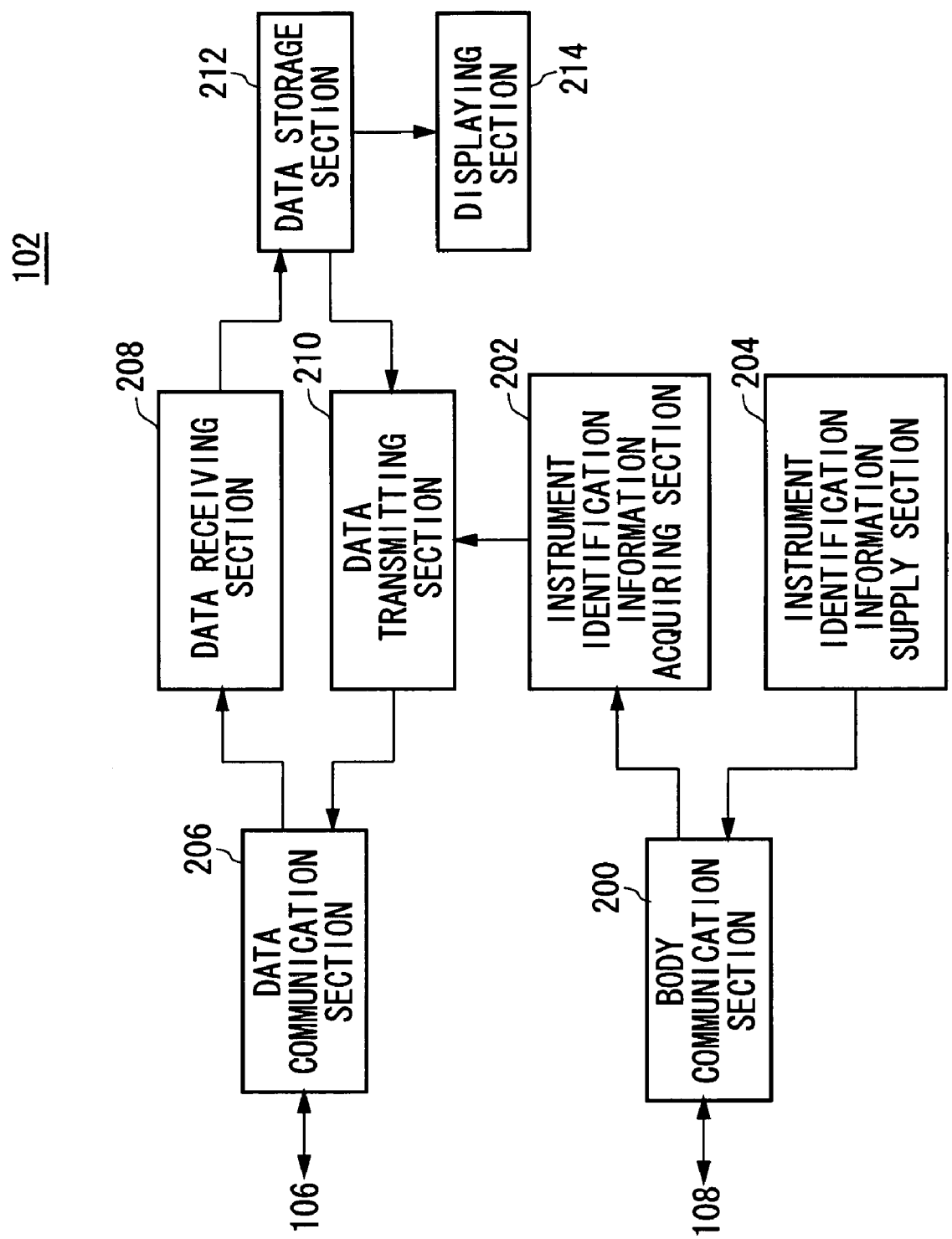
FIG. 2 is a block diagram exemplary showing a configuration of a portable terminal.

FIG. 2 is a block diagram exemplary showing a configuration of the portable terminal 102 according to the first embodiment. The portable terminal 102 includes: a body communication section 200 for communicating with a communication apparatus other than the portable terminal 102 through a human body; an instrument identification information acquiring section 202 for acquiring instrument identification information on the other communication apparatus using the body communication section 200; an instrument identification information supply section 204 for supplying the other communication apparatuses with the instrument identification information on the portable terminal 102 using the body communication section 200; a data communication section 206 for communicating with the other communication apparatus through communication means other than the human body; a data receiving section 208 for receiving data from the other communication apparatus using the data communication section 206; a data transmitting section 210 for transmitting data to the other communication apparatus using the data communication section 206; a data storage section 212 storing thereon data such as an image; and a displaying section 214 for displaying the image based on the data stored on the data storage section 212. In addition, components of each of the portable terminal 104 and the displaying apparatus 106 are similar to those of the portable terminal 102, and operation of each component of the portable terminal 104 and the displaying apparatus 106 is similar to that of the portable terminal 102.

The displaying section 214 displays the image based on the data stored on the data storage section 212 according to the instruction of the user 108. Then, the user 108 selects a communication apparatus, to which the image currently displayed on the displaying section 214 is to be transmitted, e.g., the displaying apparatus 106, by touching the body communication section 200 of the portable terminal 102 and a body communication section 110 of the displaying apparatus 106. When the body of the user 108 touches the portable terminal 102 and the displaying apparatus 106, the instrument identification information acquiring section 202 acquires the instrument identification information on the displaying apparatus 106 from the displaying apparatus 106 through the body of the user 108 using the body communication section 200. At this time, the instrument identification information acquiring section 202 transmits authentication information including a user ID, a password and the like to the displaying apparatus 106 using the body communication section 200. Then, the displaying apparatus 106 transmits the instrument identification information on the displaying apparatus 106 to the portable terminal 102, only when the authentication information received from the portable terminal 102 is authenticated.

In addition, the body communication section 200 includes a modulator, a demodulator, and a contact section which contacts with a human body. The body communication section 200 modulates a digital signal indicating the instrument identification information to a feeble electric current in the order of hundreds of microamperes having frequency in the order of dozens or hundreds of kHz. Thereby, it can communicate at the order of dozens of kbps, i.e., 128 bits of the instrument identification information can be transmitted in dozens of milliseconds. Moreover, since a communication condition of the body communication section 200 is influenced by a contact condition between a body and the contact section, it is preferable to transmit the instrument identification information several or several dozen times repeatedly. In addition, the body communication section 200 actively receives a signal of instrument identification information and the like which is sent from another body communication section continuously, or actively receives a signal of instrument identification information or the like which is sent from another body communication section by detecting that the connection to another body communication section has been established and by transmitting a signal for requesting a signal of instrument identification information or the like.

Then, the data transmitting section 210 establishes communication with the displaying apparatus 106 through the data communication section 206 based on the instrument identification information on the displaying apparatus 106. Alternatively, if the displaying apparatus 106 needs instrument identification information on the portable terminal 102 in order to establish communication between the portable terminal 102 and the displaying apparatus 106, the instrument identification information supply section 204 supplies the displaying apparatus 106 with the instrument identification information on the portable terminal 102 using the body communication section 200 so that the portable terminal 102 may communicate with the displaying apparatus 106.

When the communication between the portable terminal 102 and the displaying apparatus 106 has been established, the displaying section 214 displays a message (for example, a button labeled "Do you transmit the image?") to prompt the user 108 to determine whether or not the image currently displayed is to be transmitted. Then, if the user 108 determines that the image is to be transmitted, the data transmitting section 210 transmits the image currently displayed on the displaying section 214 to the displaying apparatus 106 identified by the instrument identification information acquired by the instrument identification information acquiring section 202.

In addition, it is preferable that an error rate of the communication through the data communication section 206 is less than an error rate of the communication through the body communication section 200. It is also preferable that a transfer rate of the communication through the data communication section 206 is greater than a transfer rate of the communication through the body communication section 200.

According to the portable terminal 102 of the present embodiment, since the communication is established by intuitive operation of touching the communication apparatus to which the user 108 wants to supply the image, complicated operation of designating the destination is unnecessary and the operability at the time of transmitting the image is improved. Moreover, since the image currently displayed on the displaying section 214 is transmitted when the user 108 touches the communication apparatus, to which the user 108 wants to supply the image, while the displaying section 214 displaying the image, complicated operation by the user, such as the selection of the image to be transmitted, is unnecessary, and the image is transmitted by simple operation.

Figure 3:
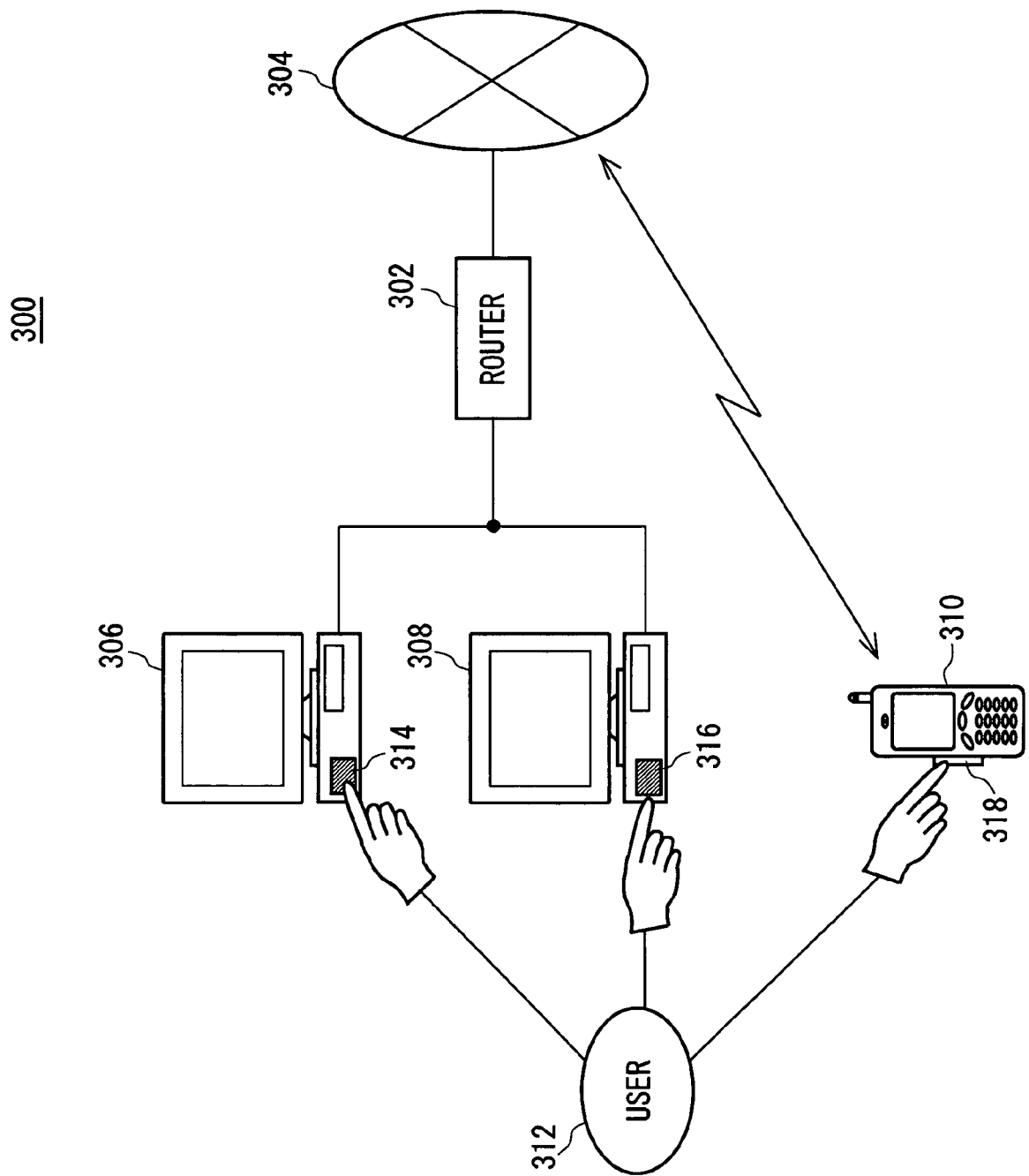
FIG. 3 is a schematic diagram exemplary showing a configuration of a communication system according to a second embodiment.

FIG. 3 is a schematic diagram exemplary showing a communication system 300 according to a second embodiment of the present invention. The communication system 300 includes fixed terminals 306 and 308 connected to Internet 304 through a router 302, and a portable terminal 310 connected to the Internet 304 through a telephone line. The fixed terminals 306 and 308 are connected to a LAN, and communicate with each other through the LAN. Moreover, the fixed terminals 306 and 308 communicate with a portable terminal 310 through the Internet 304. The fixed terminals 306 and 308 and the portable terminal 310 communicate with one another through a human body, and send and receive instrument identification information to/from one another through a body of a user 312. Each of the terminals 306 and 308 and the portable terminal 310 is an example of the communication apparatus of the present invention. For example, each of the fixed terminals 306 and 308 is a desktop PC, a television, an electronic photo frame, etc., and the portable terminal 310 is a portable telephone, a PDA, a notebook sized personal computer, etc. In addition, components of each of the fixed terminals 306 and 308 and the portable terminal 310 are similar to those of the portable terminal 102 depicted in FIG. 2, and operation of each component of the fixed terminals 306 and 308 and the portable terminal 310 is similar to that of the portable terminal 102.

When the user 312 touches a body communication section 314 of the fixed terminal 306 and a body communication section 316 of the fixed terminal 308, the fixed terminal 308 transmits an IP address or a MAC address, which is the instrument identification information on the fixed terminal 308, to the fixed terminal 306 through the body of the user 312. Then, the fixed terminal 306 transmits the data designated by the user 312 to the fixed terminal 308 through the LAN, the fixed terminal 308 being identified by the received IP address or the MAC address from the fixed terminal 308 through the body of the user 312.

Moreover, when the user 312 touches the body communication section 314 of the fixed terminal 306 and a body communication section 318 the portable terminal 310, the portable terminal 310 transmits an e-mail address, which is the instrument identification information on the portable terminal 310, to the fixed terminal 306 through the body of the user 312. Then, the fixed terminal 306 transmits the data designated by the user 312 to the portable terminal 310 via the Internet 304, the portable terminal 310 being identified by the e-mail address received from the portable terminal 310 through the body of the user 312.

As described above, the communication apparatus, to which the data is to be transmitted, is specified easily and correctly by acquiring the instrument identification information on the designated communication apparatus through the body of the user 312. Moreover, the desired data is transmitted correctly at high transfer rate by transmitting the desired data through the communication means other than the body of the user 312.

Figure 4:
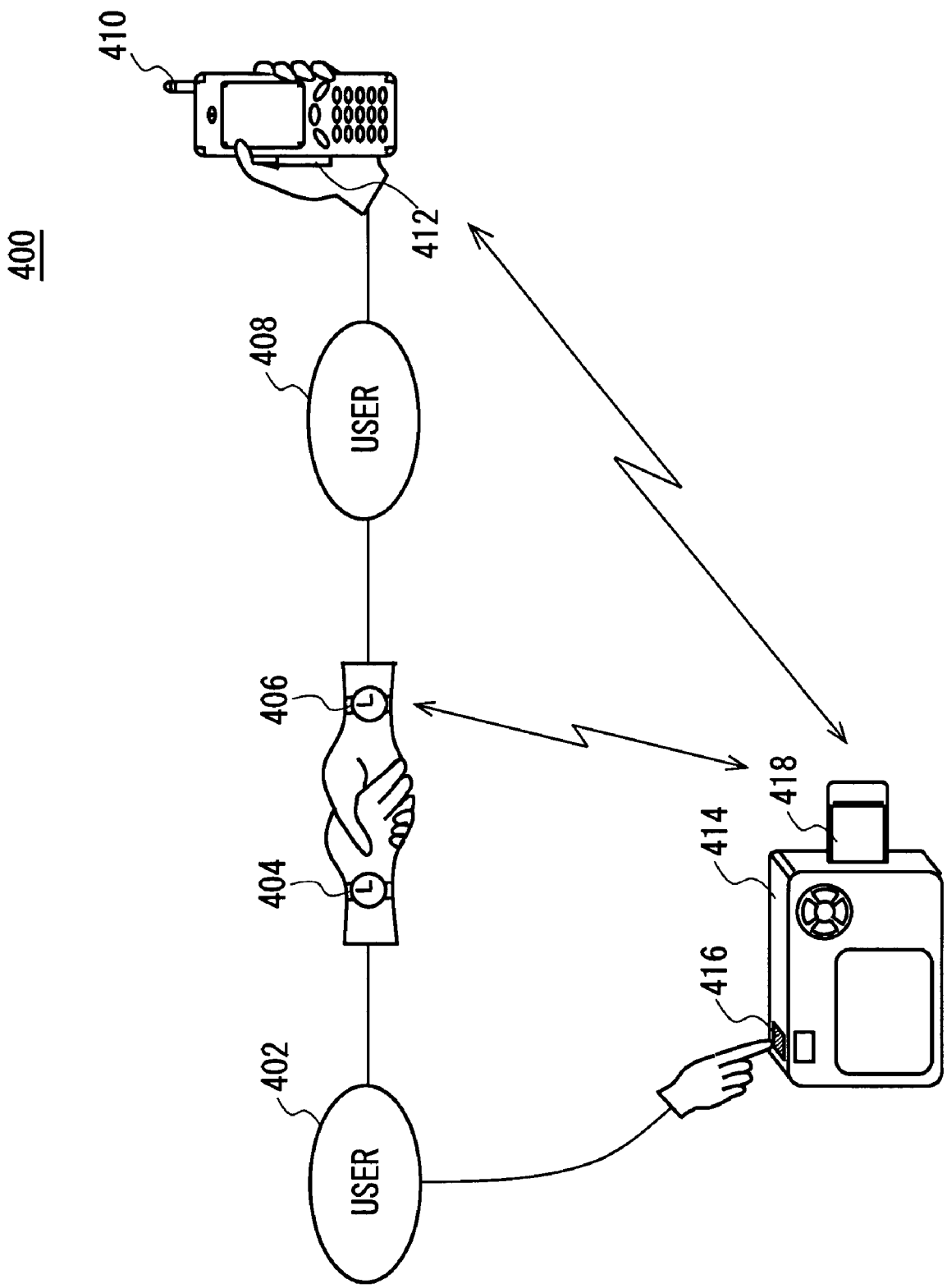
FIG. 4 is a schematic diagram exemplary showing a configuration of a communication system according to a third embodiment.

FIG. 4 is a schematic diagram exemplary showing a configuration of a communication system 400 according to a third embodiment of the present invention. The communication system 400 includes a wrist watch 406 or a portable telephone 410, and a digital camera 414. Each of the wrist watch 406, the portable telephone 410 and the digital camera 414 is an example of the communication apparatus of the present invention. In addition, the digital camera 414 has similar configuration to the portable terminal 102 depicted in FIG. 2 except otherwise described below.

The wrist watch 406 is capable of sending and receiving e-mail, and stores an e-mail address of a user 408. Moreover, the wrist watch 406 includes a body communication section used for the communication through a body, and transmits the e-mail address of the user 408 by the user 408 wearing the wrist watch 406. Moreover, the portable telephone 410 is capable of sending and receiving e-mail, and stores the e-mail address of the user 408. Moreover, the portable telephone 410 includes a body communication section 412 used for the communication through the body, and when the portable telephone 410 is held by the user 408, the e-mail address of the user 408 is transmitted through the body communication section 412 using the body communication section 412. Here, the e-mail address is an example of the instrument identification information on the present invention. Alternatively, the instrument identification information on the present invention is a telephone number of the portable telephone 410, or if the portable telephone 410 is an IP portable telephone, the instrument identification information is an IP address.

A sequence of transmitting image data stored on the digital camera 414 owned by the user 402 to the wrist watch 406 or the portable telephone 410 owned by the user 408 will be explained hereinafter. First, the user 402 selects image data, which is to be provided to the user 408, and causes the digital camera 414 to displays the image data. Then, by the user 402 touching the body communication section 416 of the digital camera 414 and shaking a hand of the user 408 simultaneously, the body communication section of the wrist watch 406 or the body communication section 412 of the portable telephone 410 of the user 408, and the body communication section 416 of the digital camera 414 are electrically connected through the body of the user 402 and the body of the user 408. Thereby, the digital camera 414 acquires the e-mail address of the user 408 from the wrist watch 406 or the portable telephone 410 through the body communication section 416. Then, the digital camera 414 stores the e-mail address, which is acquired through the body communication section 416, in association with the image data being displayed. Then, when the digital camera 414 connects with a telecommunication line other than the body communication by a data communication section 418, the data communication section 418 attaches the image data, which is stored in association with the e-mail address of the user 408, on e-mail to the user 408, and sends the e-mail. For example, the data communication section is means for connecting the digital camera 414 to LAN, or it is means for connecting the digital camera 414 directly to the Internet.

In addition, when the user 402 also wears the wrist watch 404 having similar function to the wrist watch 406, the digital camera 414 will receive the plurality of e-mail addresses simultaneously through the body communication section 416. In this case, in the condition that the image data is being displayed, the digital camera 414 stores the newly received e-mail address among the plurality of e-mail addresses in association with the image data being displayed. Thereby, when one shakes the hand of the user 408 who is to be provided with the image data, the e-mail address of the user 408 is associated with the image data, so that the user 408 is provided with the image data appropriately.

Figure 5:
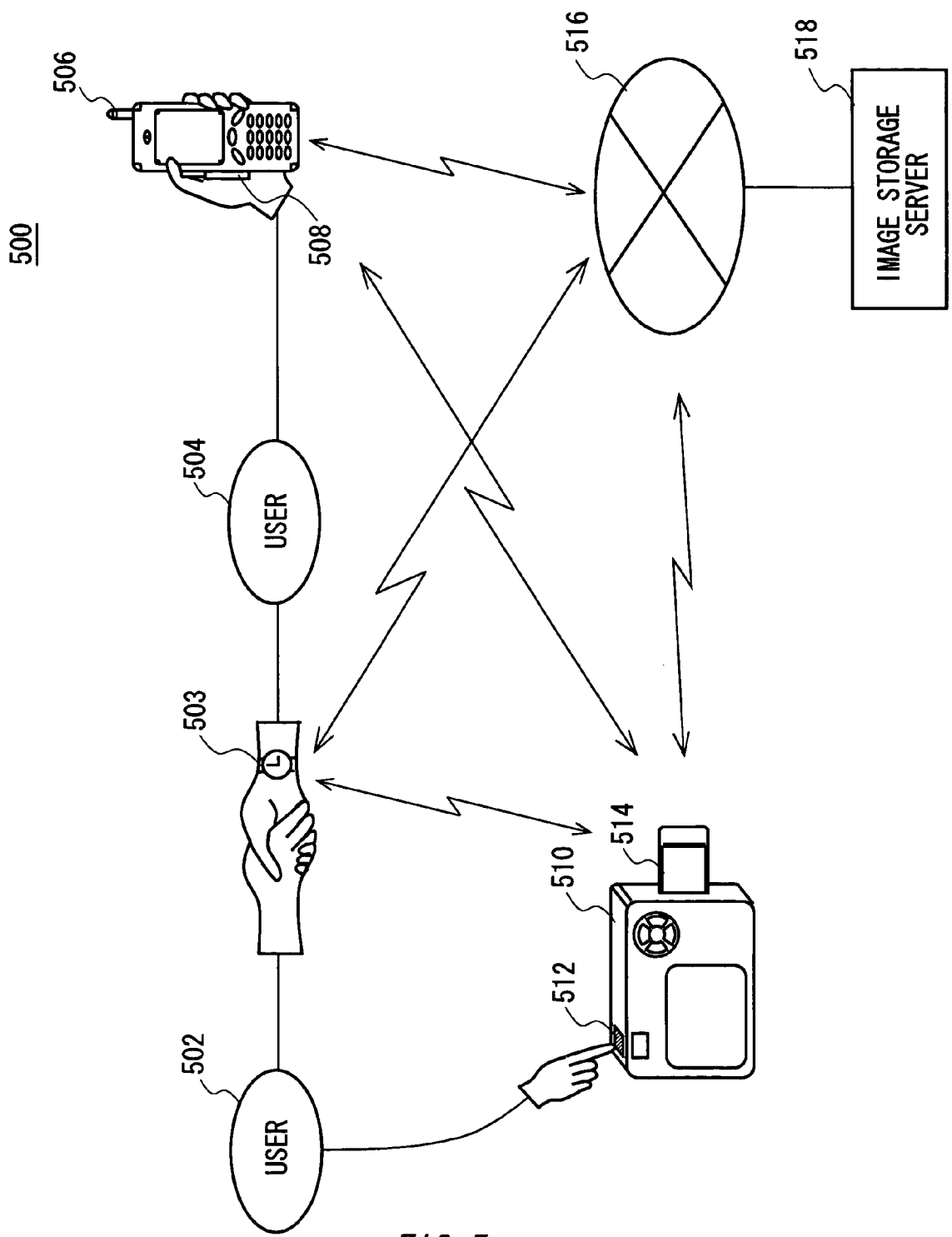
FIG. 5 is a schematic diagram exemplary showing a configuration of a communication system according to a fourth embodiment.

FIG. 5 is a schematic diagram exemplary showing a configuration of a communication system 500 according to a fourth embodiment of the present invention. The communication system 500 includes a wrist watch 503, a portable telephone 506, a digital camera 510, and an image storage server 518. In addition, the digital camera 510 has similar function to the portable terminal 102 shown in FIG. 2 except otherwise described hereinafter. Moreover, the wrist watch 503 has similar function to the wrist watch 406 shown in FIG. 4, and the portable telephone 506 has similar function to the portable telephone 410 shown in FIG. 4 except otherwise described hereinafter.

The digital camera 510 causes the image data photographed by the user 502 to be transmitted and stored on the image storage server 518 through a communication network such as the Internet 516. Then, the image storage server 518 stores the image data received from the digital camera 510 in association with access information on the image data, and transmits the access information on the image data to the digital camera 510. Then, the digital camera 510 associates the image data with the access information on the image data and stores them. For example, the access information is a URL.

A sequence of providing the user 504 with the image data by transmitting the access information on the image data stored on the digital camera 510 owned by the user 502 to the wrist watch 503 or the portable telephone 506 owned by the user 504 will be explained hereinafter. First, the user 502 selects the image data to be supplied to the user 504 and causes the digital camera 510 to display the image data. Then, by the user 502 touching the body communication section 512 of the digital camera 514 and the user 502 and the user 504 shaking hands with each other, the body communication section of the wrist watch 503 or the body communication section 508 of the portable telephone 506 of the user 504, and the body communication section 512 of the digital camera 510 are electrically connected through the body of the user 502 and the body of the user 504. Thereby, the digital camera 510 acquires an e-mail address of the user 504 from the wrist watch 503 or the portable telephone 506 through the body communication section 512. Then, the digital camera 510 stores the e-mail address acquired through the body communication section 512 in association with the access information on the image data being displayed. Then, when the digital camera 510 connects with a telecommunication line other than the body communication by a data communication section 514, the data communication section 514 attaches the access information on the image data, which is stored in association with the e-mail address, on e-mail to the user 504, and sends the e-mail. Then, the wrist watch 503 or the portable telephone 506 accesses the image data stored on the image storage server 518 through the Internet 516 based on the access information received from the digital camera 510, so that the wrist watch 503 or the portable telephone 506 acquires the image data.

Alternatively, the image storage server 518 is not limited to the server provided on the Internet. For example, the image storage server is memory in the digital camera 510. That is, the digital camera 510 transmits the identification information on the digital camera 510, identification information on a directory, identification information on the image, etc. to the wrist watch 503 or the portable telephone 506 as the access information on the image data. Then, the wrist watch 503 or the portable telephone 506 accesses the image data stored on the digital camera 510, and acquires the image data based on the access information received from the digital camera 510.

Figure 6:
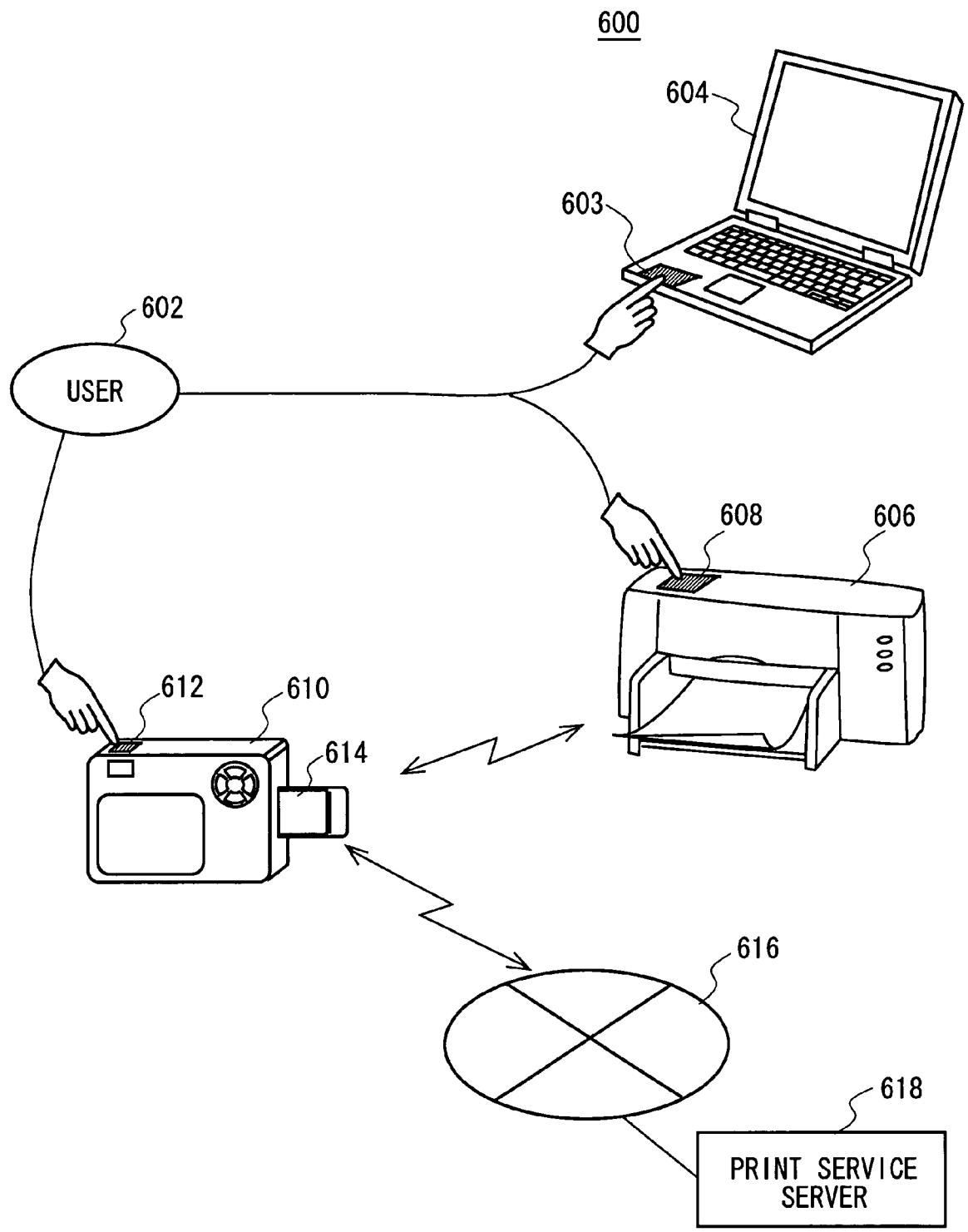
FIG. 6 is a schematic diagram exemplary showing a configuration of a communication system according to a fifth embodiment.

FIG. 6 is a schematic diagram exemplary showing a configuration of a communication system 600 according to a fifth embodiment of the present invention. The communication system 600 includes a digital camera 610 and a printer 606. The printer 606 is an example of the printer of the present invention. In addition, the digital camera 610 has similar configuration to the portable terminal 102 depicted in FIG. 2 except otherwise described below.

The printer 606 includes a body communication section 608 used for the communication through a body, and when the body communication section 608 is touched by the user 602, the instrument identification information on a printer 606 is transmitted through the body communication section 608. For example, the instrument identification information is an IP address of the printer 606. Moreover, the digital camera 610 stores image data photographed by the user 602, and the image data is transmitted to the printer 606 using the data communication section 614 and the printer 606 is adapted to print the image data based on an instruction of the user 602.

A sequence of transmitting the image data stored on the digital camera owned by the user 602 to the printer 606 and printing the image data will be explained hereinafter. First, the user 602 selects the image data, which is to be printed, and causes the digital camera 610 to display the image data. Then, when the body of the user 602 touches a body communication section 612 of the digital camera 610 and a body communication section 608 of the printer 606, an instrument identification information acquiring section of the digital camera 610 acquires instrument identification information on the printer 606 from the printer 606 through the body of the user 602 using the body communication section 612. Then, the digital camera 610 saves the instrument identification information on the printer 606 acquired by the instrument identification information acquiring section through the body communication section 612 as incidental information on the image data being displayed. Then, when the digital camera 610 is connected to the printer 606 by the data communication section 614 through a telecommunication line other than the body communication, a data transmitting section of the digital camera 610 transmits the image data to the printer 606, which is identified by the instrument identification information acquired by the information acquiring section using the data communication section 614, and causes the printer 606 to print the image data so that the digital camera 610 may causes the printer 606 to print the image data stored in association with the instrument identification information on the printer 606 as the incidental information.

Moreover, when the body of the user 602 touches the body communication section 612 of the digital camera 610 and the body communication section 608 of the printer 606 multiple times during a predetermined time interval, the instrument identification information acquiring section of the digital camera 610 acquires the instrument identification information on the printer 606 from a printer 606 multiple times using the body communication section 608. For example, the user 602 touches the body communication section 608 of the printer 606 multiple times during a predetermined time interval while the user 602 touches the body communication section 612 of the digital camera 610 continuously. Thereby, the instrument identification information acquiring section of the digital camera 610 acquires the instrument identification information on the printer 606 multiple times during a predetermined time interval. Then, the digital camera 610 saves the instrument identification information on the printer 606 acquired by the instrument identification information acquiring section with the number how many times the identical instrument identification information is acquired as incidental information on the image data being displayed. Then, when the digital camera 610 connects with the printer 606 by the data communication section 614 through a telecommunication line other than the body communication, a data transmitting section of the digital camera 610 transmits the image data and the number of sheets for printing corresponding to the number how many times the instrument identification information acquiring section acquires the instrument identification information as the incidental information on the image data to the printer 606, which is identified by the instrument identification information acquired by the information acquiring section using the data communication section 614, and causes the printer 606 to print the image data so that the digital camera 610 may causes the printer 606 to print a plurality of sheets of the image data being stored in association with the instrument identification information on the printer 606 as the incidental information.

Alternatively, the communication system 600 includes a personal computer 604 and a print service server 618 instead of the printer 606. The personal computer 604 and the print service server 618 are examples of the printer of the present invention.

The personal computer 604 connects with the print service server 618 through a communication network such as the Internet 616, and the personal computer 604, provides the print service server 618 with the image data, printing conditions, etc., and places an order for printing of the image data. Moreover, the personal computer 604 includes a body communication section 603 used for the communication through a body, and when the body communication section 603 is touched by the user 602, the instrument identification information on the print service server 618 connected with the personal computer 604 is transmitted using the body communication section 608. For example, the instrument identification information is a URL of the print service server 618. Moreover, the print service server 618 receives the order of the printing of the image data from the personal computer 604 or the digital camera 610.

A sequence of transmitting the image data stored on the digital camera 610 owned by the user 602 to the print service server 618 and printing the image data will be explained hereinafter. First, the user 602 causes the personal computer 604 to connect with the print service server 618, and to display a website of the print service server 618 by a web browser or the like. Then, the user 602 selects the image data to be printed and causes the digital camera 610 to display the image data. Then, when the body of the user 602 touches a body communication section 612 of the digital camera 610 and a body communication section 603 of the personal computer 604, an instrument identification information acquiring section of the digital camera 610 acquires instrument identification information on the print service server 618 connected with the personal computer 604 from the personal computer 604 through the body of the user 602 using the body communication section 612. Then, the digital camera 610 saves the instrument identification information on the print service server 618 acquired by the instrument identification information acquiring section through the body communication section 612 as incidental information on the image data being displayed. Then, when the digital camera 610 connects with the print service server 618 by the data communication section 614 through a communication network such as the Internet 616, the data transmitting section of the digital camera 610 transmits the image data, which is stored with the instrument identification information on the print service server 618 as the incidental information, to the print service server 618, and causes the print service server 618 to print the image data. At this time, the data transmitting section of the digital camera 610 may transmit a user ID by which the print service server 618 identifies the user 602, a printing condition of the image data, etc. to the print service server 618 with the image data.

Figure 7:
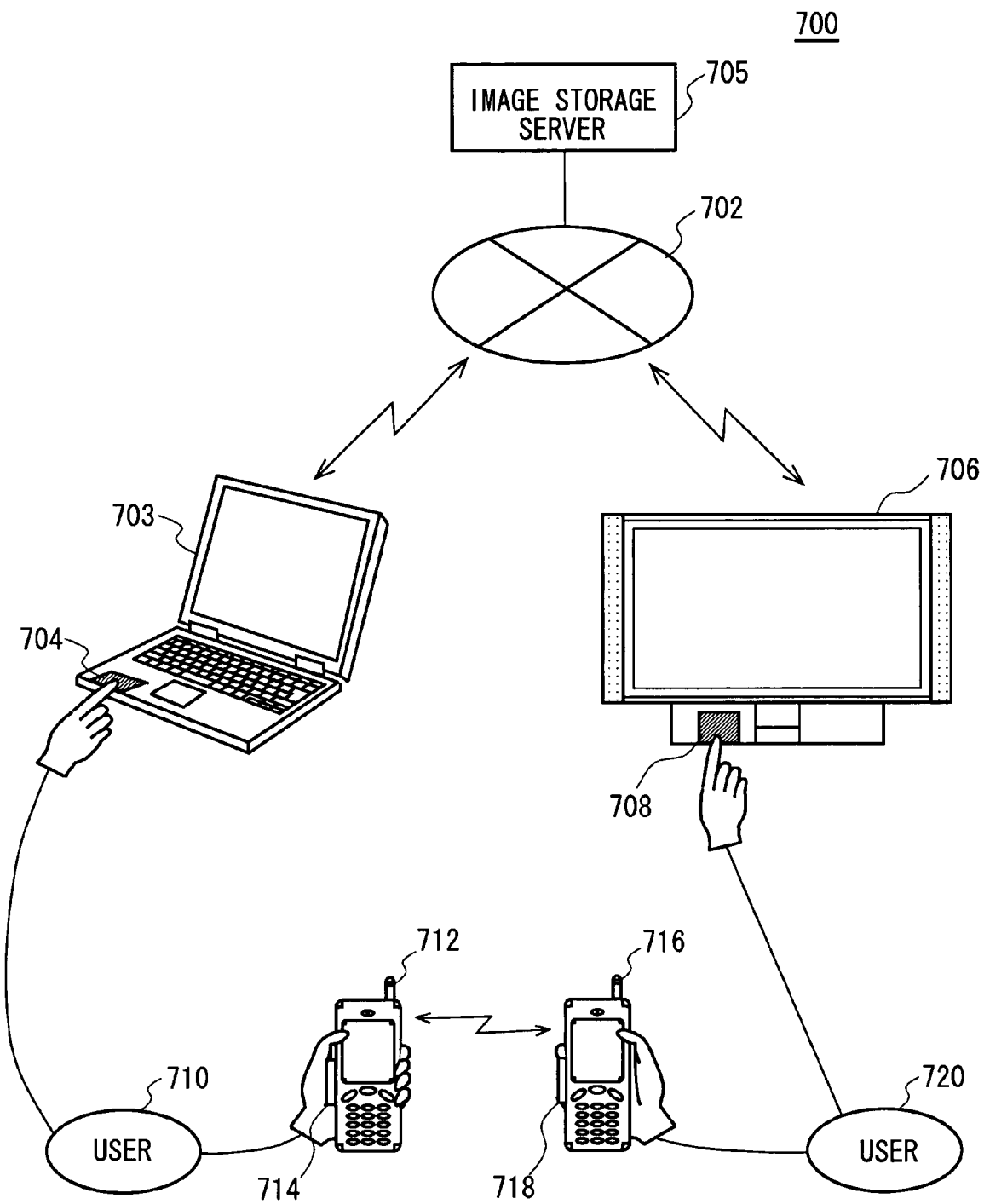
FIG. 7 is a schematic diagram exemplary showing a configuration of a communication system according to a sixth embodiment.

FIG. 7 is a schematic diagram exemplary showing a configuration of a communication system 700 according to a sixth embodiment of the present invention. The communication system 700 includes a personal computer 703, an image storage server 705, a displaying apparatus 706, a portable telephone 712, and a portable telephone 716. In addition, each of the personal computer 703, the displaying apparatus 706, the portable telephone 712, and the portable telephone 716 has similar function to the portable terminal 102 shown in FIG. 2 except otherwise described below.

The personal computer 703 transmits the image data saved by the user 710 through a communication network such as the Internet 702, and causes the image storage server 705 to store the image data. Then, the image storage server 705 stores the image data received from the personal computer 703 in association with access information on the image data, and transmits it to the personal computer 703. Then, the personal computer 703 accesses the image data using the access information on the image data, and displays the image data. Moreover, the personal computer 703 includes a body communication section 704 used for the communication through a body, and when the body communication section 704 is touched by the user 710, the access information on the image data being displayed on the personal computer 703 is transmitted using the body communication section 704. For example, the access information is a URL.

A sequence of transmitting the image data stored on the image storage server 705 by the user 710 to the displaying apparatus 706 of the user 720, and displaying the image data will be explained hereinafter. First, the user 710 causes the personal computer 703 to connect with the image storage server 705, and to display the image data stored on the image storage server 705 by a web browser or the like based on access information on the image data. Then, when the user 710 touches the body communication section 704 of the personal computer 703 and the body communication section 714 of the portable telephone 712, an instrument identification information acquiring section of the portable telephone 712 acquires the access information on the image data being displayed on the personal computer 703 using the body communication section 714 from the personal computer 703 through a body of the user 710. Then, by using e-mail transmission-and-reception function of the portable telephone 712, the user 710 attaches the access information on the image data, which is acquired from the personal computer 703 by the instrument identification information acquiring section, on e-mail and sends the e-mail to the portable telephone 716. Alternatively, the user 710 displays the access information on a plurality of files of the image data, without connecting the personal computer 703 to the image storage server 705. Then, when the user 710 touches the body communication section 704 of the personal computer 703 and the body communication section 714 of the portable telephone 712, the instrument identification information acquiring section of the portable telephone 712 acquires the access information on the plurality of files of the image data being displayed on the personal computer 703 from the personal computer 703.

Next, the user 720 causes the portable telephone 716 to display the access information on the image data received from the portable telephone 712. Then, when the user 720 touches the body communication section 718 of the portable telephone 716 and the body communication section 708 of the displaying apparatus 706, the instrument identification information acquiring section of the displaying apparatus 706 acquires the access information on the image data being displayed on the portable telephone 716 using the body communication section 708 from the portable telephone 716 through a body of the user 720. Then, the displaying apparatus 706 accesses the image data stored on the image storage server 705 through the Internet 702 based on the access information received from the portable telephone 716, and acquires and displays the image data. Alternatively, when the displaying apparatus 706 accesses the image data of the image storage server 705, the image storage server 705 is provided with a specification, such as the number of pixels of the displaying apparatus 706. Then, based on the specification of the displaying apparatus 706 provided from the displaying apparatus 706, the image storage server 705 converts the size of the image data, and then transmit it to the portable telephone 716. For example, when the displaying apparatus 706 is a portable telephone, the image storage server 705 generates a thumbnail image of the image data, of which the size is reduced from the original image data, and transmits it to the displaying apparatus 706.

According to the communication system 700 of the present embodiment, if the user 710 knows the e-mail address of the portable telephone 716 of the user 720, even if the user 710 does not know another e-mail addresses of the user 720, such as the e-mail address of the personal computer of the user 720, the user 710 can easily send the image owned by the user 710, so that the user 720 looks at the image.

Figure 8:
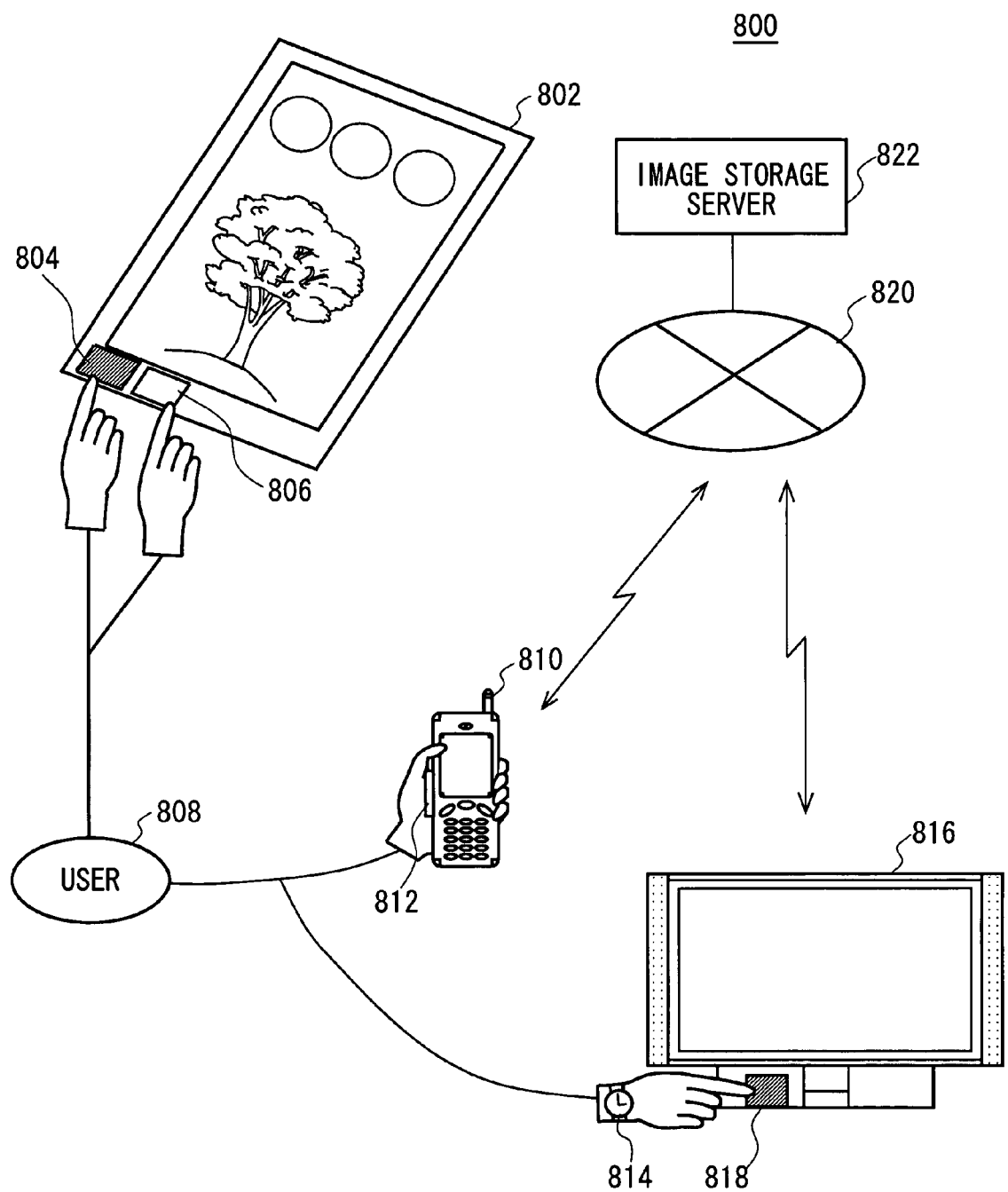
FIG. 8 is a schematic diagram exemplary showing a configuration of a communication system according to a seventh embodiment.

FIG. 8 is a schematic diagram exemplary showing a configuration of a communication system 800 according to a seventh embodiment of the present invention. The communication system 800 includes a print medium 802, a portable telephone 810, a wrist watch 814, a displaying apparatus 816, and an image storage server 822. In addition, each of the portable telephone 810 and the displaying apparatus 816 has similar function to the portable terminal 102 shown in FIG. 2, and the wrist watch 814 has similar function to the wrist watch 406 shown in FIG. 4, except otherwise described below.

An image, e.g., design for an advertising circular, is printed on the print medium 802, and a communication apparatus, such as IC tag chip integrated with memory storing thereon the access information on the image data associated with the image, is embedded on the print medium 802. For example, a scene of a movie is printed on the print medium 802, and the memory, such as the IC tag chip, embedded in the print medium 802 stores a URL, which is access information on image data, or a website of the movie etc. Moreover, the body communication sections 804 and 806, which is used for the communication through a body, are included in the print medium 802, and the body communication section 804 transmits the access information on the image data stored on the memory, such as the IC tag chip, embedded in the print medium 802. Moreover, the memory, such as the IC tag chip, embedded in the print medium 802, stores setting information for clearing the access information received from the body communication section 804 and stored on the portable telephone 810 and the wrist watch 814. Then, the body communication section 806 clears the access information stored on the portable telephone 810 or the wrist watch 814 by transmitting the setting information stored on the memory, such as the IC tag chip, to the portable telephone 810 or the wrist watch 814. In addition, for example, it is preferable that the appearances of the body communication section 804 and the body communication section 806 are different with each other so that the user 808 can distinguish sensuously the body communication section 804 and the body communication section 806. For example, the access information is indicated by alphabetical characters on the body communication section 806 which transmits the access information to the portable telephone 810 or the wrist watch 814, and the body communication section 806 for clearing the access information stored on the portable telephone 810 or the wrist watch 814 is smeared with white.

A sequence of the portable telephone 810 or the displaying apparatus 816 receiving and displaying the image data relevant to the image printed on the print medium 802 from the image storage server 822 will be explained hereinafter. First, the user 808 peruses the print medium 802. When the user want to acquire the image data relevant to the image printed on the print medium 802, the user touches the body communication section 812 of the portable telephone 810 and the body communication section 804 on the print medium 802 simultaneously. Thereby, the instrument identification information acquiring section of the portable telephone 810 acquires the access information on the image data stored on the memory embedded in the print medium 802 from the print medium 802 through a body of the user 808 using the body communication section 812. Then, the portable telephone 810 accesses the image data stored on the image storage server 822 through a communication network such as the Internet 820 based on the access information on the image data received from the print medium 802, and acquires and displays the image data.

In another example, when the user touches the body communication section 804 of the print medium 802 when the user are wearing the wrist watch 814, the instrument identification information acquiring section of the wrist watch 814 acquires the access information on the image data stored on the memory embedded in the print medium 802 using the body communication section 812 from the print medium 802 through the body of the user 808. In addition, when the user 808 touches a plurality of body communication sections 804 of each of a plurality of print media 802 one by one, the instrument identification information acquiring section of the wrist watch 814 acquires the access information on the image data stored on the plurality of memory embedded in the plurality of print media 802, respectively from the plurality of print media 802 one by one. Then, the wrist watch 814 stores the access information on the image data received from the print media 802 one by one. Then, when the user 808 touches the body communication section 818 of the displaying apparatus 816 while the user 808 is wearing the wrist watch 814, the instrument identification information acquiring section of the displaying apparatus 816 acquires the access information on the image data stored on the wrist watch 814 using the body communication section 818 from the wrist watch 814 through the body of the user 808. Then, the displaying apparatus 816 accesses the image data stored on the image storage server 822 through a communication network such as the Internet 820 based on the access information on the image data received from the wrist watch 814, and acquires and displays the image data. Alternatively, when the displaying apparatus 816 receives the access information on the plurality of files of the image data from the wrist watch 814 based on the access information on a plurality of image data, the displaying apparatus 816 acquires the plurality of files of the image data one by one from the image storage server 822, and displays the files of the image data one by one.

According to the communication system 800 of the present embodiment, information, such as image data relevant to image of the print media 802, can be acquired with avoiding the trouble of the user inputting the URL or the like printed on the print medium 802 such as a poster into the portable telephone or the personal computer. Moreover, since the image data relevant to the image of print medium 802 is acquirable only by touching the print media 802, the image data is acquirable as if the user were choosing the printed photograph.

Figure 9:
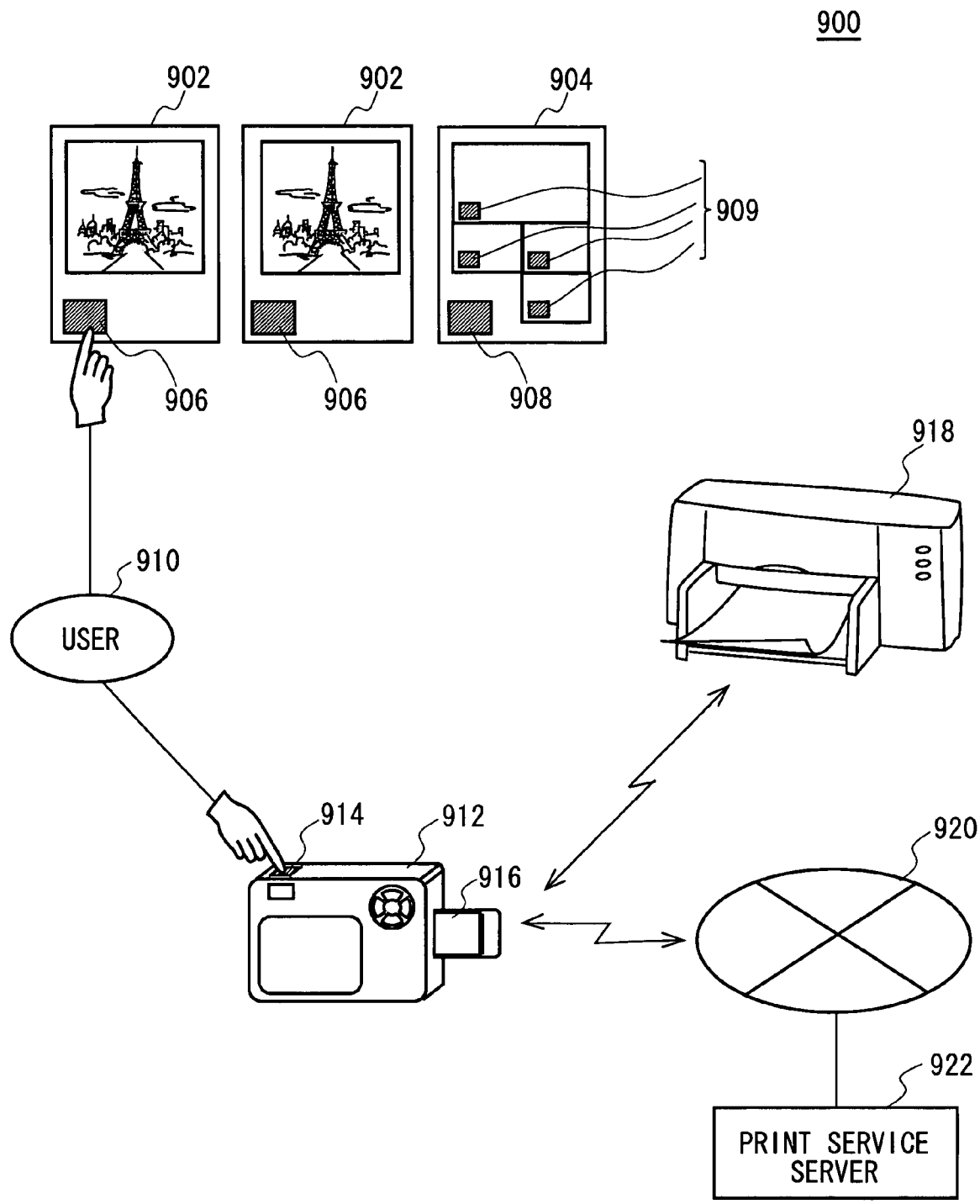
FIG. 9 is a schematic diagram exemplary showing a configuration of a communication system according to an eighth embodiment.

FIG. 9 is a schematic diagram exemplary showing a configuration of a communication system 900 according to an eighth embodiment of the present invention. The communication system 900 includes print media 902 and 904, a digital camera 912, a printer 918, and a print service server 922. In addition, the digital camera 912 has similar function to the portable terminal 102 shown in FIG. 2, and the printer 918 has similar function as the printer 606 shown in FIG. 6, except otherwise described below.

An image is printed on the print medium 902 with a predetermined printing condition, and a communication apparatus, such as IC tag chip integrated with memory storing thereon the printing condition of the image, is embedded in the print medium 902. Here, the printing condition is such as print size, a type of surface such as matte or glossy, a printing quality such as photograph mode or normal mode, and the like. Moreover, the body communication section 906 used for the communication through a body is provided on the print media 902, and the body communication section 906 transmits the printing conditions stored on the memory, such as the IC tag chip, embedded in the print media 902. Moreover, a format of an album, on which a plurality of image frames are provided, is printed on the print medium 904, and a communication apparatus, such as an IC tag chip including memory storing identification information on the format is embedded in the print medium 904, and communication apparatuses such as IC tag chips, each of which includes memory storing identification information on corresponding image frame among the plurality of image frames, are also embedded on the print medium 904. Moreover, the body communication sections 908 and 909 used for the communication through a body are provided on the print medium 904. The body communication section 908 transmits the identification information on the format stored on the memory, such as the IC tag chip, embedded in the print medium 904, and each of the body communication sections 909 transmits the identification information on the image frame stored on the memory, such as the IC tag chip, embedded in each of the image frames on the print medium 904.

A sequence of transmitting the image data stored on the digital camera 912 owned by a user 910 and printing the image data will be explained hereinafter. First, the user 910 selects the image data which is to be printed and causes the digital camera 912 to display the image data. Next, the user 910 peruses the print media 902, selects one of the print media 902 printed with a desired printing condition, and touches the body communication section 906 provided on the print media 902 and the body communication section 914 of the digital camera 912 simultaneously. Thereby, the instrument identification information acquiring section of the digital camera 912 acquires the printing condition stored on the memory embedded in the print media 902 from the print media 902 through a body of the user 910 using the body communication section 914. Then, the digital camera 912 saves the printing condition acquired by the instrument identification information acquiring section through the body communication section 914 as incidental information on the image data being displayed. Then, when the digital camera 912 connects with the printer 918 via the data communication section 916, the digital camera 912 transmits the printing conditions, which is saved as the incidental information, to the printer 918, and causes the printer 918 to print the image data based on the printing condition transmitted with the image data.

Moreover, in another example, the user 910 peruses the print medium 904 on which the format of the album is printed, and selects a desired image frame. Then, the user 910 touches the body communication section 908 provided on the print medium 904 and the body communication section 914 of the digital camera 912 simultaneously. Thereby, the instrument identification information acquiring section of the digital camera 912 acquires the identification information on the format stored on the memory embedded in the print medium 904 from the print medium 904 through a body of the user 910 using the body communication section 914. Next, the user 910 selects the image data to be printed by touching the body communication section 914 of the digital camera 912 and the body communication section 909 provided in each image frame on the print medium 904 simultaneously, and causes the digital camera 912 to display the image data. Thereby, the instrument identification information acquiring section of the digital camera 912 acquires the identification information on the image frame stored on the memory embedded in the print medium 904 from the print medium 904 through the body of the user 910 using the body communication section 914. The digital camera 912 saves the identification information on the image frame acquired by the instrument identification information acquiring section through the body communication section 914 as incidental information on the image data being displayed. The identification information on the selected image frame is also saved as incidental information on each of a plurality of files of image data by displaying the image data one by one and by touching one of the body communication sections 909 provided on each image frame. Then, when the digital camera 912 connects with the printer 918 via the data communication section 916, the digital camera 912 transmits the identification information on the format acquired from the print medium 904, and the identification information on the plurality of image frames saved as the incidental information with the plurality of files of the image data, to the printer 918, and causes each of the files of the image data selected in the digital camera 912 by the user 910 to be printed on an image frame corresponding to one of the image frame of the format of the album of the print medium 904 selected by the user 910, respectively.

In another example, the digital camera 912 transmits the image data to the print service server 922 connected through a communication network such as the Internet 920 and causes the print service server 922 to print the image data. In this case, the memory, such as the IC tag chip, embedded in the print media 902 and 904, further stores a URL, which is access information on the print service server 922. Then, the instrument identification information acquiring section of the digital camera 912 acquires the access information on the print service server 922 from the print medium 902 or 904 with the printing condition or the identification information on the format. Then, the digital camera 912 accesses the print service server 922, transmits the image data based on the access information on the print service server 922 acquired from the print medium 902 or 904, and causes the print service server 922 to print the image data.

Figure 10:
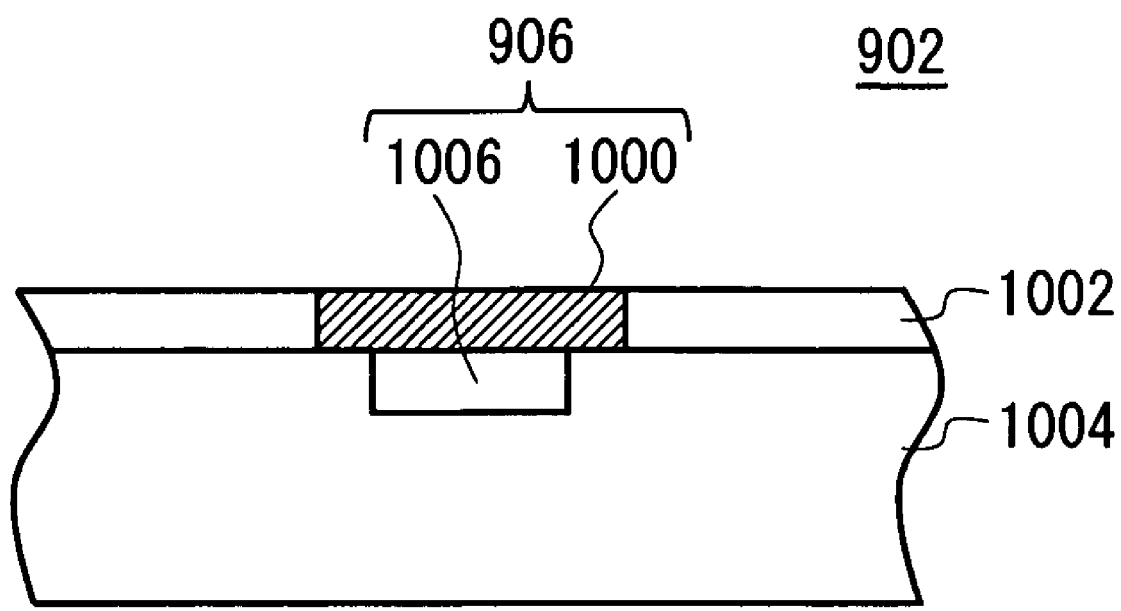
FIG. 10 is a schematic diagram exemplary showing a configuration of a print medium in the vicinity of a body communication section.

FIG. 10 is a schematic diagram exemplary showing a configuration of the print medium 902 in the vicinity of the body communication section 906. Since the configuration of the print medium 902 in the vicinity of the body communication sections 804 and 806 and the configuration of the print media 904 in the vicinity of the body communication sections 908 and 909 are similar to that of the print media 902 in the vicinity of the body communication section 906, explanation will be omitted.

The print medium 902 includes an ink absorption layer 1002 which absorbs ink, and a support layer 1004 which supports the print media 902. The body communication section 906 includes a conductive layer 1000 in the ink absorption layer 1002, the conductive layer 1000 having electrical conductivity, and an IC tag chip 1006 storing thereon the printing condition, the IC tag chip being embedded in the support layer 1004. The conductive layer 1000 and the IC tag chip 1006 are electrically connected to each other, and the signal indicating the printing condition output from the IC tag chip 1006 is output to a body of a user who touches the conductive layer 1000.

Figure 11:
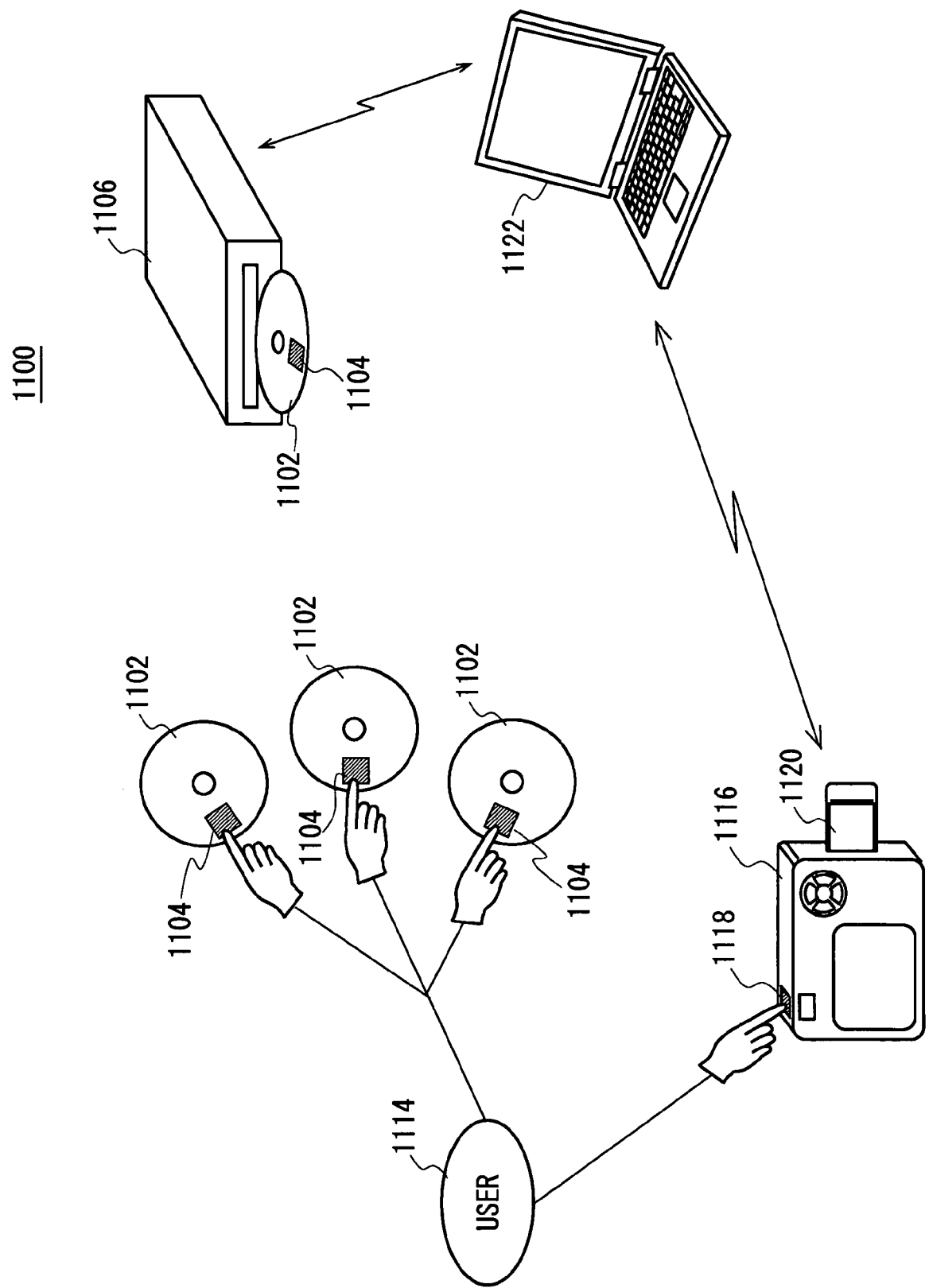
FIG. 11 is a schematic diagram exemplary showing a configuration of a communication system according to a ninth embodiment.

FIG. 11 is a schematic diagram exemplary showing a configuration of a communication system 1100 according to a ninth embodiment of the present invention. The communication system 1100 includes record media 1102, a media drive 1106, a digital camera 1116, and a personal computer 1122. The record media 1102 are examples of the communication apparatus of the present invention. For example, the record media 1102 are DVDs or the like. The media drive 1106 is an example of the recording device of the present invention. In addition, the digital camera 1116 has similar function to the portable terminal 102 shown in FIG. 2 except otherwise described below.

A communication apparatus, such as an IC tag chip including memory storing a media ID number that is identification information on the record media 1102, is embedded in each of the record media 1102. Each of the record media 1102 includes a body communication section 1104 which is used for the communication through a body, and the body communication section 1104 transmits the media ID number stored on the memory, such as the IC tag chip, embedded in each of the record media 1102. Moreover, the personal computer 1122 controls writing and reading of the media drive 1106.

A sequence of writing the image data stored on the digital camera 1116 owned by a user 1114 on one of the record media 1102 selected by the user 1114 will be explained hereinafter. First, the user 1114 selects image data to be written on the record media 1102 from the digital camera 1116 and causes the digital camera 1116 to display the image data. Next, the user 1114 selects a desired record medium 1102 from the plurality of record media 1102, and touches a body communication section 1118 of the digital camera 1116 and a body communication section 1104 provided on the selected record medium 1102 simultaneously. When the body of the user 1114 touches the body communication section 1118 of the digital camera 1116 and the body communication section 1104 of the record media 1102, the instrument identification information acquiring section of the digital camera 1116 acquires the media ID number stored on the memory embedded in the selected record medium 1102 from the selected record medium 1102 through a body of the user 1114 using the body communication section 1118. Then, the digital camera 1116 saves the media ID number acquired by the instrument identification information acquiring section through the body communication section 1118 as incidental information on the image data being displayed. Then, when the digital camera 1116 and the media drive 1106, in which the selected record medium 1102 identified by the media ID number stored as the incidental information with the image data is inserted, are connected through the data communication section 1120, the data transmitting section of the digital camera 1116 transmits the image data to the media drive 1106 using the data communication section 1120 so that the image data may be stored on the selected record medium 1102. For example, the personal computer 1122 reads the media ID number from the record medium 1102 inserted in the media drive 1106, and searches the image data, which is to be written on the record medium 1102 identified by the media ID number, in the digital camera 1116. Then, when the digital camera 1116 stores the image data in association with the media ID number, the digital camera 1116 transmits the image data searched with the personal computer 1122 to the media drive 1106 through the personal computer 1122, and causes the media drive 1106 to write the image data on the record medium 1102 identified by the media ID number.

According to the communication system 1100 of the present embodiment, since the image data can be written on the selected record medium 1102 only by perusing the image data in the digital camera 1116 one by one and by touching the record medium 1102 on which the image data is to be stored, the image data which is photographed with the digital camera 1116 is easily classifiable.

Although the present invention has been described by way of an exemplary embodiment, it should be understood that those skilled in the art might make many changes and substitutions without departing from the spirit and the scope of the present invention. It is obvious from the definition of the appended claims that embodiments with such modifications also belong to the scope of the present invention.

What is claimed is:

1. A communication apparatus for communicating with another device by transmitting data through a human body of a user, comprising:

a body communication section for communicating with a communication apparatus, other than the communication apparatus, by electrically transmitting data through the human body;

an instrument identification information acquiring section for acquiring instrument identification information on the other communication apparatus from the other communication apparatus using said body communication section when the human body touches said body communication section of the communication apparatus and a body communication section of the other communication apparatus;

a data communication section for communicating with the other communication apparatus through communication means other than the human body; and a data transmitting section for transmitting data to the other communication apparatus identified by the instrument identification information acquired by said instrument identification information acquiring section using said data communication section, wherein said other communication apparatus is a printing apparatus comprising a body communication section for communicating through the human body, said instrument identification information acquiring section acquires instrument identification information on said printing apparatus from said printing apparatus using said body communication section when the body touches said body communication section of the communication apparatus and said body communication section of said printing apparatus, said data transmitting section transmits the image data to said printing apparatus identified by the instrument identification information acquired by said instrument identification information acquiring section using said data communication section so that the image data stored on the communication apparatus is to be printed, said instrument identification information acquiring section acquires instrument identification information on said printing apparatus multiple times from said printing apparatus using said body communication section when the body touches said body communication section of the communication apparatus and said body communication section of said printing apparatus multiple times during a predetermined time interval, and said data transmitting section transmits the number of sheet for printing corresponding to the number how many times said instrument identification information acquiring section acquires the instrument identification information as incidental information on the image data with the image data to said printing apparatus identified by the instrument identification information acquired by said instrument identification information acquiring section using said data communication section so that a plurality of files of image data stored on the communication apparatus are to be printed.

2. A communication system for communicating with another device through a human body, comprising:

a storing apparatus which stores data in association with access information on the data;

a first communication apparatus including a body communication section for communicating through the human body and a data communication section for communicating through communication means other than the human body; and a second communication apparatus having a display and including a body communication section for communicating through the human body, a data communication section for communicating through communication means other than the human body, and a storing section for storing the access information in advance, wherein said second communication apparatus acquires identification information of said first communication apparatus through the human body when the human body touches said body communication section of the first communication apparatus and the body communication section of the second communication apparatus, and when the second communication device displays the access information on the display, said first communication apparatus also acquires the access information through the human body when the human body touches said body communication section of the first communication apparatus and the body communication section of the second communication apparatus.

3. The communication system as claimed in claim 2, wherein said data communication section of said first communication apparatus acquires the data stored in said storing apparatus from said storing apparatus through the communication means other than the human body, based on the access information transmitted from said second communication apparatus.

4. The communication system as claimed in claim 2, further comprising:
an image capturing section for photographing the image, wherein
said data communication section of said second communication apparatus transmits the image photographed by said image capturing section to said storing apparatus through the communication means other than the human body, and
said storing apparatus stores the transmitted image in association with the access information on the transmitted image.

5. A communication system for communicating with another device through a human body, comprising:
a storing apparatus which stores data in association with access information on the data;
a print medium on which information in relation to the data is printed, including a body communication section for communicating through the human body and a memory for storing the access information in advance;
a communication apparatus including a body communication section for communicating through the human body and a data communication section for communicating through communication means other than the human body, wherein
said communication apparatus acquires the access information stored on said memory of said print medium through the human body when the human body touches said body communication section of said print medium and said body communication section of said communication apparatus, and acquires the data in association with the acquired access information from the storing apparatus through the communication means other than the human body.

6. The communication system as claimed in claim 5, wherein said body communication section and said memory of the print medium are provided in a IC tag chip.

7. The communication system as claimed in claim 5, wherein
said print medium further includes another body communication section,
said memory of the print medium further stores setting information for clearing the access information, and
said communication apparatus acquires the setting information stored in said memory of said print medium through the human body when the human body touches said other body communication section of said print medium and said body communication section of said communication apparatus, and clears the acquired access information using the setting information.

8. The communication system as claimed in claim 5, wherein said data include image data and an image corresponding to the image data is printed on the print medium as the information in relation to the data.

9. A communication system for communicating with another device through a human body, comprising:
a printer;
a print medium on which an image is printed, including a body communication section for communicating through the human body and a memory for storing a printing condition of the image; and
a communication apparatus including a body communication section for communicating through the human body, a data communication section for communicating through communication means other than the human body and a displaying section for displaying the image, wherein
said communication apparatus acquires the printing condition stored in said memory of said print medium through the human body when the human body touches said body communication section of said print medium and said body communication section of said communication apparatus while said displaying section displays the image, and transmits the printing condition to said printer together with the image displayed on said displaying section, and
said printer prints out the transmitted image using the transmitted printing condition.

10. The communication system as claimed in claim 9, wherein said body communication section and said memory of the print medium are provided in a IC tag chip.

11. The communication system as claimed in claim 9, wherein said printer is connected to said communication apparatus via an Internet.

* * * * *